US008902698B2

(12) United States Patent  (10) Patent No.: US 8,902,698 B2
Hegna et al.  (45) Date of Patent: Dec. 2, 2014

(54) METHODS AND APPARATUS FOR SEISMIC EXPLORATION USING PRESSURE CHANGES CAUSED BY SEA-SURFACE VARIATIONS

(75) Inventors: Stian Hegna, Hovik (NO); Walter Söllner, Oslo (NO)

(73) Assignee: PGS Geophysical AS, Lysaker (NO)

( * ) Notice: Subject to any disclaimer, the term of this patent is extended or adjusted under 35 U.S.C. 154(b) by 713 days.

(21) Appl. No.: 13/149,512

(22) Filed: May 31, 2011

(65) Prior Publication Data

US 2012/0307591 A1  Dec. 6, 2012

(51) Int. Cl.
G01V 1/38 (2006.01)
G01V 1/30 (2006.01)

(52) U.S. Cl.
CPC .................................. *G01V 1/30* (2013.01)
USPC .......................................................... 367/21

(58) Field of Classification Search
CPC ................................ G01V 1/36; G01V 1/3808
USPC ........ 367/14, 15, 21, 24; 181/100; 702/14, 17
See application file for complete search history.

(56) References Cited

U.S. PATENT DOCUMENTS

| | | | | |
|---|---|---|---|---|
| 6,903,998 | B2 * | 6/2005 | Vaage | 367/24 |
| 7,872,942 | B2 | 1/2011 | Sollner | |
| 2008/0253227 | A1 | 10/2008 | Sollner | |
| 2009/0279387 | A1 * | 11/2009 | Tenghamn et al. | 367/21 |
| 2009/0323469 | A1 * | 12/2009 | Beasley | 367/24 |
| 2010/0008184 | A1 | 1/2010 | Hegna et al. | |
| 2011/0085420 | A1 * | 4/2011 | Bussat et al. | 367/47 |

FOREIGN PATENT DOCUMENTS

WO  2009081150 A1  7/2009

OTHER PUBLICATIONS

Nick Moldoveanun, et al Over under towed streamer acquisition a method to extend a seismic bandwidth to both higher and lower frequencies. Jan. 2007 The Leading Edge.*
N.D. Whitmore, et al. "Imaging of primaries and multiples using a dual-sensor towed streamer", 2010, pp. 3187-3192, SEG Denver 2010 Annual Meeting.
A.C. Kibblewhite, et al. "The theoretical description of wave-wave interactions as a noise source in the ocean", May 1991, pp. 2241-2251, Dept. of Physics, The University of Auckland, New Zealand.
Andrew Long, et al. "Seismic frequency bandwidth constraints in deepwater survey locations", Dec. 2004, pp. 55-60, first break vol. 22.
Jon F. Claerbout "Geophysics—Toward A Unified Theory Of Reflector Mapping", Jun. 1971, pp. 467-481, vol. 36.
Roel Snieder, et al. "Imaging with ambient noise", Sep. 2010, pp. 44-49, Physics Today feature article.
Nick Moldoveanu, et al. "Over/under towed-streamer acquisition: A method to extend seismic bandwidth to both higher and lower frequencies", Jan. 2007, pp. 41-58, The Leading Edge.

(Continued)

*Primary Examiner* — Isam Alsomiri
*Assistant Examiner* — Amienatta M Ndure Jobe

(57) ABSTRACT

Disclosed are apparatus and methods for seismic exploration using pressure changes caused by sea-surface variations as a low-frequency seismic energy source. One embodiment relates to a method which obtains dual wave-fields measured below a sea surface. The measured dual wave-fields are decomposed into a down-going wave-field and an up-going wave-field at a selected observation level. Seismic images are then generated using the down-going and up-going wave-fields. Other embodiments, aspects, and features are also disclosed.

24 Claims, 10 Drawing Sheets

(56) References Cited

OTHER PUBLICATIONS

European Search Report mailed on Mar. 25, 2014, for application No. 12170084.3, 5 pages.
Okwudili Orji et al., "Imaging The Sea Surface Using a Dual-Sensor Towed Streamer", Geophysics, Society of Exploration Geophysicists, US, Nov. 1, 2010, pp. V111-V1118, vol. 75, No. 6, XP001562807.
Richard Gotto et al., "Source and Receiver Measurements and Corrections for the Effects of Sea Surface Wave Heights". SEG Technical Program Expanded Abstracts, Jan. 1, 2008, pp. 60-64. XP055108607.

\* cited by examiner

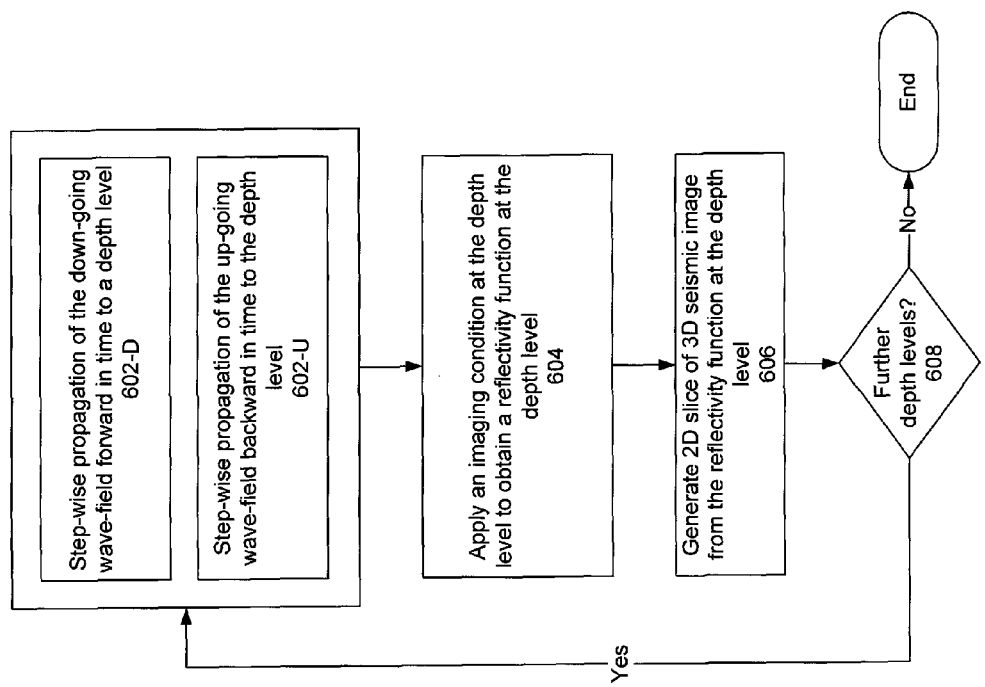
FIG. 6    600
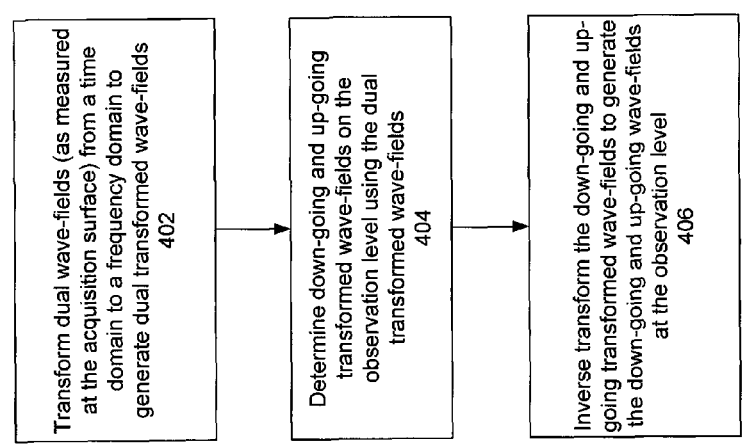
FIG. 4    400

METHODS AND APPARATUS FOR SEISMIC EXPLORATION USING PRESSURE CHANGES CAUSED BY SEA-SURFACE VARIATIONS

BACKGROUND

In the oil and gas industry, geophysical prospecting is commonly used to aid in the search for and evaluation of subterranean formations. Geophysical prospecting techniques yield knowledge of the subsurface structure of the earth, which is useful for finding and extracting valuable mineral resources, particularly hydrocarbon deposits such as oil and natural gas. One technique of geophysical prospecting is a seismic survey. In a marine seismic survey, the seismic signal will first travel downwardly through a body of water overlying the subsurface of the earth.

Seismic energy sources (active seismic sources) are generally used to generate the seismic signal. Conventional energy sources for marine seismic surveys include air guns, water guns, marine vibrators, and other devices for generating acoustic wave-forms. After the seismic signal propagates into the earth, it is at least partially reflected by subsurface seismic reflectors. Such seismic reflectors are typically interfaces between subterranean formations having different elastic properties, specifically wave velocity and rock density, which lead to differences in acoustic impedance at the interfaces.

The reflections may be detected by marine seismic sensors (also called receivers) in an overlying body of water or alternatively on the sea floor. Conventional types of marine seismic sensors include particle-velocity sensors (geophones), water-pressure sensors (hydrophones), and other types of sensors. The resulting seismic data may be recorded and processed to yield information relating to the geologic structure and properties of the subterranean formations and their potential hydrocarbon content.

BRIEF DESCRIPTION OF THE DRAWINGS

FIG. 4 is a flow chart showing a method of generating down-going "source" and up-going "receiver" wave-fields on an observation level in accordance with an embodiment of the invention.

FIG. 6 is a flow chart showing one method of generating seismic images using the down-going "source" and up-going "receiver" wave-fields in accordance with an embodiment of the invention.

Note that the figures provided herewith are not necessarily to scale. They are provided for purposes of illustration to ease in the understanding of the presently-disclosed invention.

DETAILED DESCRIPTION

The process of seismic inversion is highly sensitive to the frequency content of the seismic sources. The seismic bandwidth relates directly to the image resolution while the field strength at low frequencies is responsible for the depth penetration of the wave-field. However, conventional active marine seismic sources generate insufficient amplitudes at low frequencies to stabilize the inversion process. As a consequence, applicants believe that it is highly desirable to improve methods and apparatus for marine seismic imaging and inversion by complementing the seismic bandwidth on the low-frequency end with naturally-generated pressure changes of the time-varying sea surface.

The present disclosure provides methods and apparatus for marine seismic imaging using pressure changes caused by sea-surface variations as a passive seismic source. These sea-surface variations are time-varying displacements of the sea surface relative to an idealized "flat" sea surface. In accordance with the seismic imaging technique disclosed herein, an active seismic source is not necessarily required, though may be used in addition to the passive source.

Figure 1:
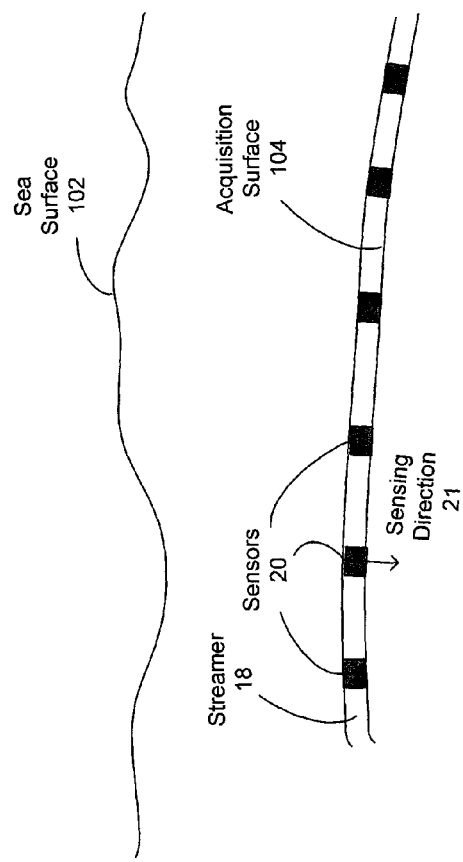
FIG. 1 is a cross-sectional view of marine-towed wave-field sensors in accordance with an embodiment of the invention.

FIG. 1 is a cross-sectional view of marine-towed wave-field sensors 20 in accordance with an embodiment of the invention. As shown, a plurality of sensors 20 may be towed using a streamer 18. The sensors 20 may measure and record one or more wave-fields over time. An array of sensors 20 towed on multiple streamers 18 may define a smoothly-varying acquisition surface 104 below a sea surface 102. The smoothly-varying acquisition surface 104 is not necessarily flat and may, in fact, change shape over time due to weather conditions, variation of sea currents, and so forth.

In one embodiment, each sensor 20 in the array may be a dual sensor including two different types of sensors. The two different types of sensors may be co-located at discrete positions which may be regularly-spaced along each streamer 18. The sensing direction 21 of a directional sensor (such as a particle-velocity sensor, a particle-acceleration sensor, or a pressure-gradient sensor) may be in a direction normal to the acquisition surface 104.

In one embodiment, a dual sensor may include a water-pressure sensor (hydrophone) and a particle-velocity sensor (geophone). In an alternate embodiment, a dual sensor may measure water pressure and particle acceleration. In another embodiment, the sensors may measure water pressure and a pressure gradient (or pressure derivative), for example, using a marine-towed over/under streamer. In other embodiments, other combinations of sensor types may be used.

Figure 2:
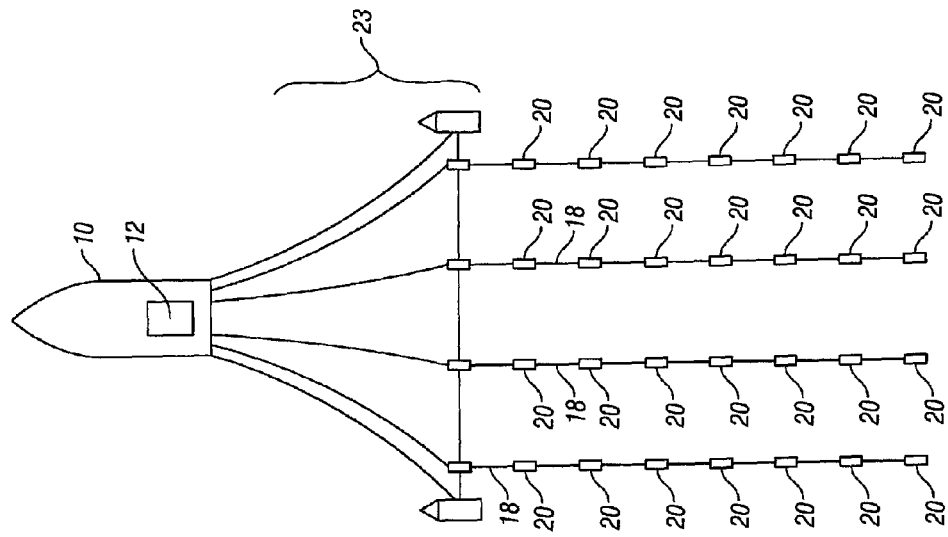
FIG. 2 is a plan view of the marine-towed wave-field sensors in accordance with an embodiment of the invention.

FIG. 2 is a plan view of the marine-towed wave-field sensors 20 in accordance with an embodiment of the invention. As shown, the streamers 18 may be maintained in their relative lateral and longitudinal positions with respect to the vessel 10 using towing equipment 23. It is contemplated that a wide variety of towing equipment may be employed, both currently available and to be developed. A data recording system 12 on the vessel may be used to record time-dependent signals obtained by the array of sensors 20 being towed by the vessel 10.

Since the streamers 18 are towed, the velocity of the lateral streamer movement is taken into account to determine the dual wave-fields in fixed receiver positions. Alternatively, instead of using moving receivers (towed streamers), stationary receivers may be used. The stationary receivers may be, for example, ocean bottom cables or nodes.

Note that no active seismic source is shown in FIGS. 1 and 2. This is because the presently-disclosed technique does not necessarily require such an active source. Instead, the technique takes advantage of passive sources (primarily pressure changes caused by sea-surface variations) to perform seismic imaging.

Figure 3:
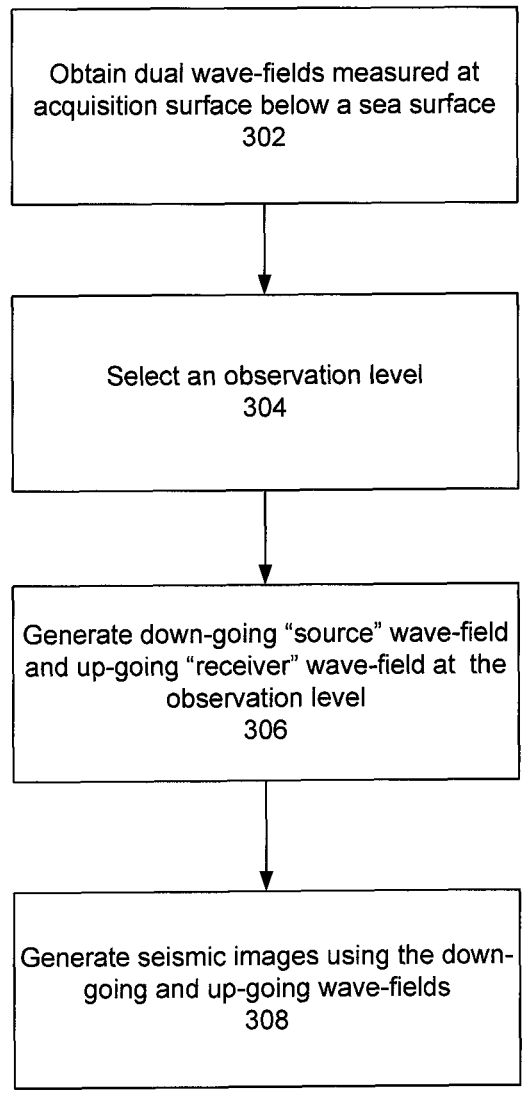
FIG. 3 is a flow chart showing a method for marine seismic imaging using pressure changes caused by sea-surface variations in accordance with an embodiment of the invention.

FIG. 3 is a flow chart showing a method 300 for marine seismic imaging using pressure changes caused by sea-surface variations in accordance with an embodiment of the invention. Such seismic imaging may be used to retrieve material properties and geological structure of subsurfaces below the sea floor. The method 300 of FIG. 3 may be performed using a computer apparatus, and the seismic images generated by the method 300 may be, for example, printed on paper or displayed on a monitor of the computer apparatus.

As shown, dual wave-fields may be obtained 302 by a computer. The dual wave-fields may be time-dependent wave-fields that are measured at an acquisition surface 104 below a sea surface 102.

In accordance with an embodiment of the invention, the measured wave-field data of interest is in a frequency range substantially lower than previous frequencies used for marine seismic imaging. For example, the frequency range of interest may be below five hertz, preferably below one hertz. Such low-frequency wave-fields are caused, at least in part, by variations of the sea surface.

The dual wave-fields comprise two different wave-fields that may be measured at a same time by dual wave-field sensors. In one embodiment, one of the measured wave-field signals may be isotropic (without directional sensitivity or a magnitude only signal), and another of the measured wave-field signals may be directional (with a directional sensitivity or a vector signal). In one implementation, a first measured wave-field may be a pressure wave-field measured by hydrophones, and a second wave-field may be a particle-velocity wave-field measured by geophones. Other types of wave-fields may be measured in other implementations.

An observation level may be selected 304 by the computer. The observation level may be flat and at an arbitrary depth. Such an observation level 110 is depicted, for example, in FIGS. 5A and 5B.

The computer may then generate 306, at the observation level, a "source" wave-field of down-going energy and a "receiver" wave-field of up-going energy. One method 400 of determining the down-going wave-field and the up-going wave-field at the observation level is described below in relation to FIG. 4. In accordance with an embodiment of the invention, if the energetic source for the wave-fields is pressure changes caused by sea-surface variations, then the frequency range of the wave-fields may be a low frequency range (for example, below five hertz).

Using the down-going and up-going wave-fields, the computer may generate 308 seismic images at various depth levels. One method 600 of generating seismic images using the down-going and up-going wave-fields is described below in relation to FIG. 6. The seismic images may then be displayed on a monitor or printed by the computer, for example.

FIG. 4 is a flow chart showing one method 400 of generating down-going "source" and up-going "receiver" wave-fields at an observation level in accordance with an embodiment of the invention. Block 306 in FIG. 3 may be implemented, for example, using this method 400. In other embodiments, alternative methods may be used to implement Block 306 in FIG. 3.

As shown in FIG. 4, the dual time-dependent wave-fields (as measured at the acquisition surface) may be transformed 402 by a computer from a time domain to a frequency domain. This results in the generation of dual transformed wave-fields. In accordance with an embodiment of the invention, the frequency domain of the dual transformed wave-fields may include a low-frequency range substantially below what is used for imaging in conventional marine seismic data (for example, up to and below one hertz) so as to include wave-fields originating from pressure changes due to sea-surface variations as a primary source.

Using the dual transformed wave-fields, down-going and up-going transformed wave-fields may be determined 404 on the observation level. The down-going and up-going transformed wave-fields may then be inverse transformed 406 to generate the down-going and up-going time-dependent wave-fields at the observation level.

Figure 5A:
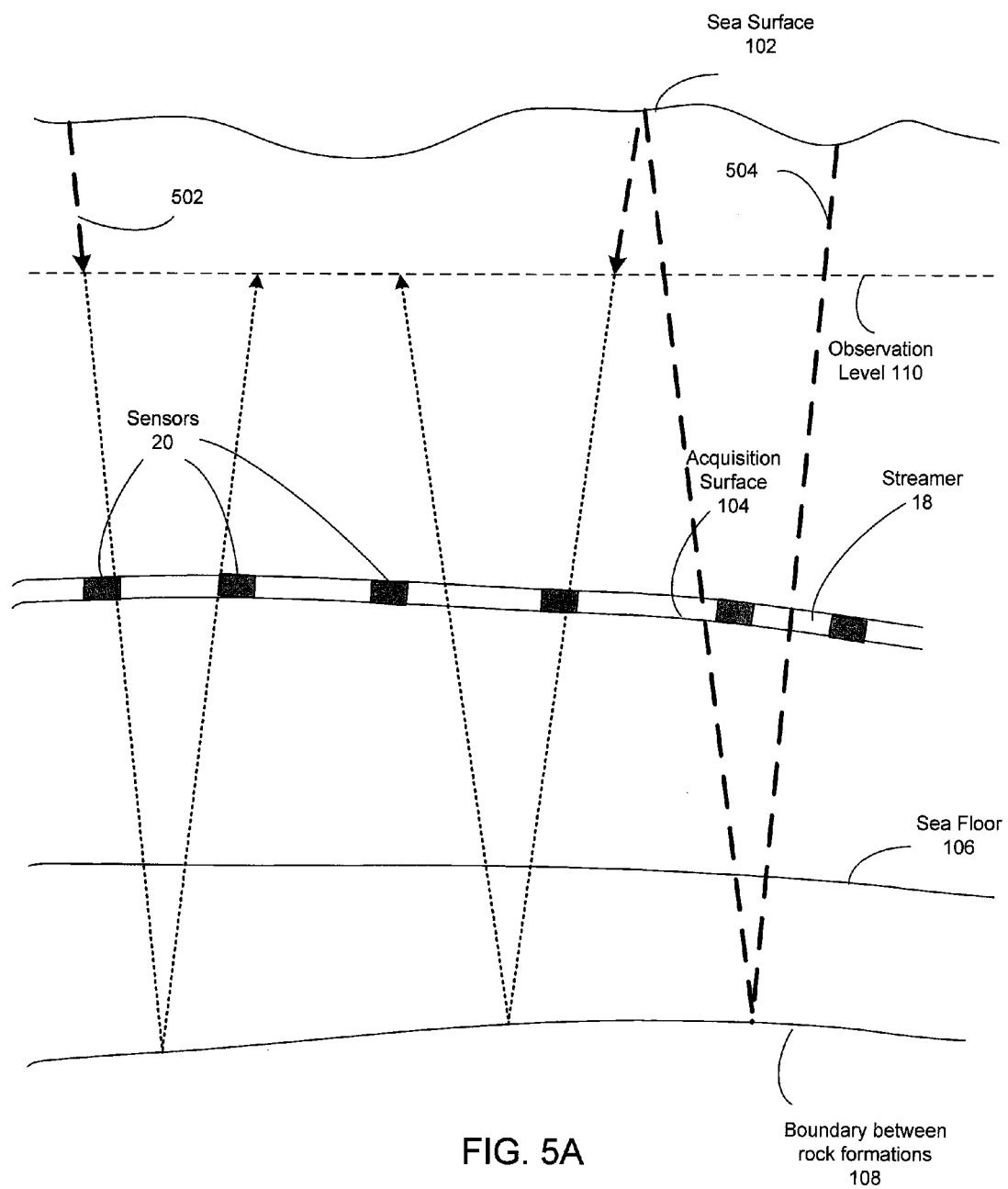
FIGS. 5A and 5B are cross-sectional views depicting example ray paths originating from a sea surface in accordance with an embodiment of the invention.

FIG. 5A is a cross-sectional view depicting example ray paths (502 and 504) for down-going wave-field components at the observation level in accordance with an embodiment of the invention. The first example ray path 502 depicts the path of a down-going wave-field component which comes directly from the sea-surface source. The second example ray path 504 depicts the path of a doubly-reflected down-going wave-field component which originates from the sea-surface source, is reflected upwards from a rock-formation boundary 108 below the sea floor 106, and is reflected downwards from the sea surface 102. There are, of course, a multitude of such ray paths that originate from the sea surface 102 and have as a final "leg" an down-going path to the observation level. The down-going wave-field at the observation level represents the vector summation of all such down-going wave-field components.

Figure 5B:
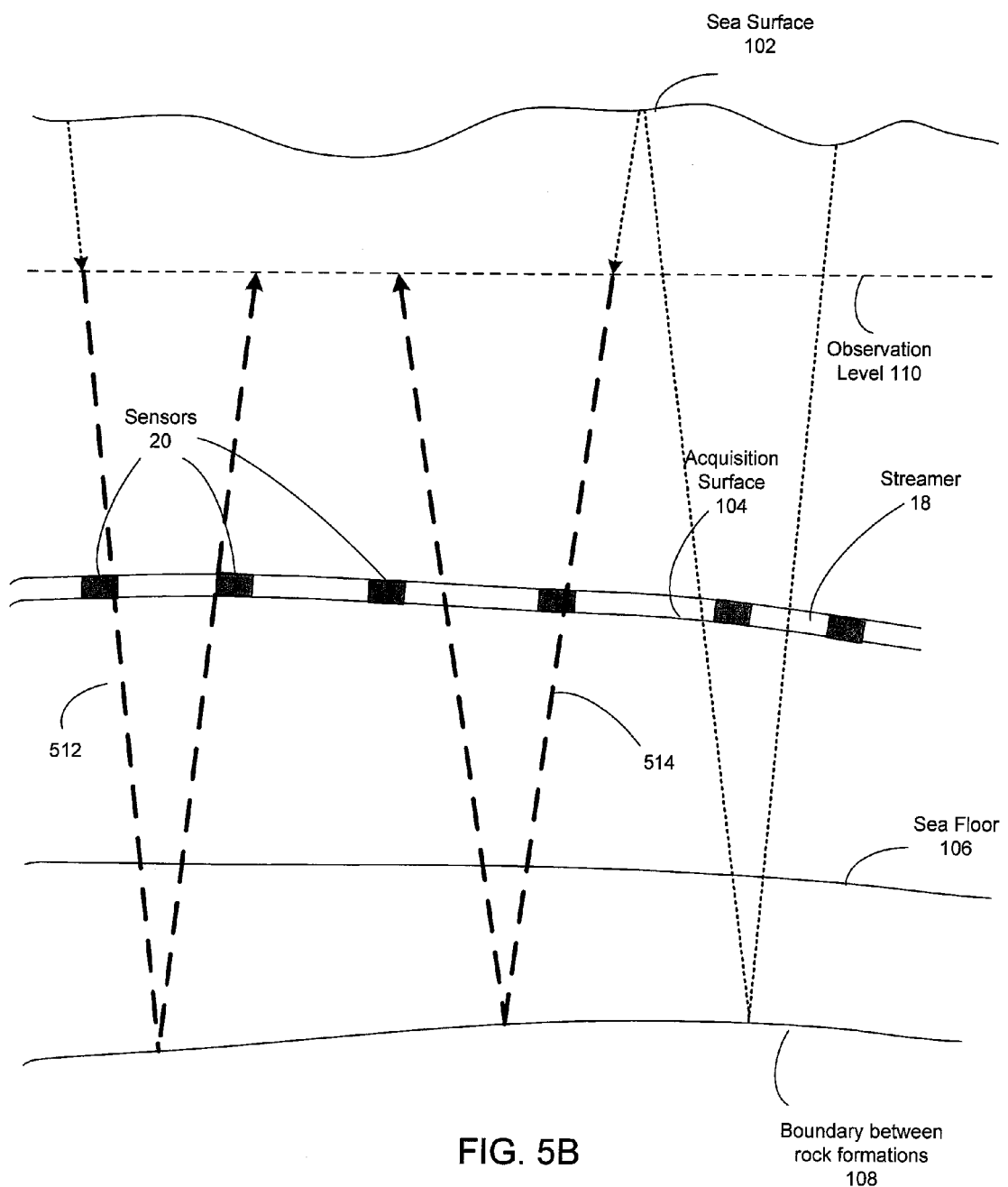

FIG. 5B is a cross-sectional view depicting example ray paths (512 and 514) for up-going wave-field components at the observation level in accordance with an embodiment of the invention. The first example ray path 512 is a continuation of the first example ray path 502 of FIG. 5A. This ray path 512 starts downward at the observation level and is reflected upwards by the rock-formation boundary 108 below the sea floor 106 before reaching the observation level in an up-going direction. The second example ray path 514 is a continuation of the second example ray path 504 of FIG. 5A. This ray path 514 starts downward at the observation level and is reflected upwards from the rock-formation boundary 108 before reaching the observation level in an up-going direction. There are, of course, a multitude of such ray paths for wave-fields that have as a final "leg" an up-going path to the observation level. The up-going wave-field at the observation level represents the vector summation of all such up-going wave-field components.

Above the observation level, there are primary and secondary sources contributing to the down-going "source" wave-field. In accordance with an embodiment of the invention, the primary sources include "passive" or naturally-generated sources, such as, for example, pressure variations due to sea-surface waves, direct radiation of air turbulences into the sea surface, interactions between sea-surface waves, and other similar sources. (As described further below, the primary sources may also include "active" or artificially-generated seismic sources, such as conventional seismic sources, in addition to the passive sources.) The secondary sources contributing to the down-going source wave-field may include down-going energy scattered from the rough sea-surface or at any position of a turbulent layer above the observation level. These secondary sources include, for example, all subsurface reflections and multiple-reflections which have as a final "leg" a down-going travel path to the observation level.

Below the observation level, the up-going "receiver" wave-field may be considered as generated by subsurface reflections of the down-going "source" wave-field. In particular, the down-going source wavefield may be reflected at boundaries between different wave media. As depicted in FIGS. 5A and 5B, one such boundary is at the sea floor 106, and another such boundary may be at a boundary 108 between rock formations.

As described herein, the combination of the down-going "source" wave-field and the up-going "receiver" wave-field allows for the extraction of the subsurface reflectivity function. This is because, in accordance with an embodiment of the invention, at any depth level below the sea surface, the up-going "receiver" wave-field may be considered to be the subsurface reflectivity convolved with the down-going "source" wave-field. As such, the subsurface reflectivity function at a specific depth level may be extracted by deconvolution of the down-going and up-going wave-fields at that depth level.

FIG. 6 is a flow chart showing one method 600 of generating seismic images using the down-going "source" and up-going "receiver" wave-fields in accordance with an embodiment of the invention. Block 308 in FIG. 3 may be implemented using this method 600.

Given the down-going and up-going wave-fields at the selected observation level, step-wise propagation may be performed to determine the down-going and up-going wave-fields at any depth level. In particular, to determine the down-going and up-going wave-fields at a particular depth level below the observation level, the down-going wave-field is propagated step-wise 602-D forward in time to the particular depth level, and the up-going wave-field is propagated step-wise 602-U backward in time to the particular depth level. Deconvolution of the low-frequency down-going and up-going wave-fields at the particular depth level may then be performed 604 to obtain a subsurface reflectivity function at that depth level, and a two-dimensional (2D) slice of a three-dimensional (3D) seismic image may be generated 606 from the reflectivity function at that depth level. Per block 608, if there are further depth levels to be seismically-imaged, then the method 600 loop back and perform step-wise propagation to the next depth level to be imaged.

Other methods for generating seismic images using the low-frequency down-going "source" and up-going "receiver" wave-fields may also be implemented. For example, one alternative method involves correlating the forward-propagated down-going wave-field with the backward-propagated up-going wave-field to image the subsurface.

Figure 8:
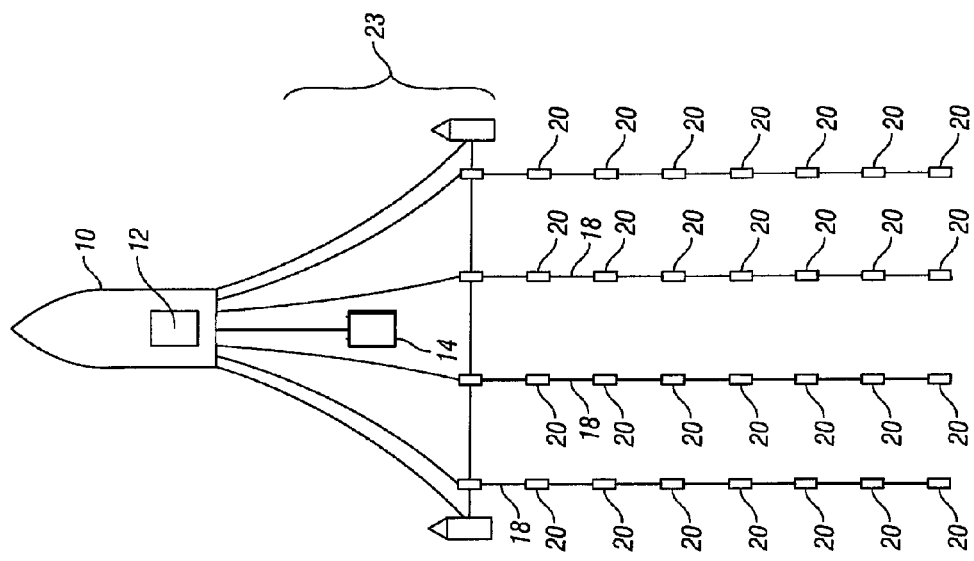
FIG. 8 is a plan view of the marine-towed wave-field sensors and a seismic source in accordance with an embodiment of the invention.
Figure 7:
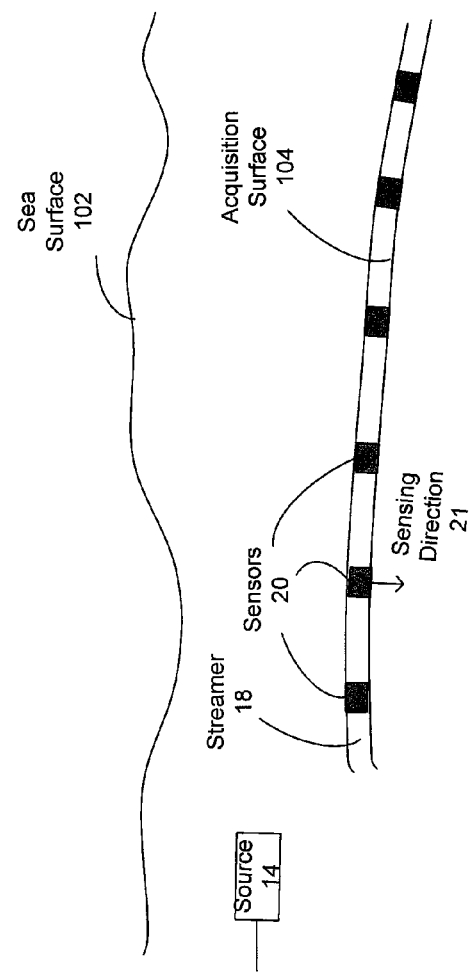
FIG. 7 is a cross-sectional view depicting wave-field sensors and a seismic source in accordance with an embodiment of the invention.

FIG. 7 is a cross-sectional view depicting wave-field sensors 20 and a seismic source 14 in accordance with an embodiment of the invention. While one active sources is depicted in this embodiment, other embodiments may have two or more active sources. As shown in the plan view of FIG. 8, the seismic source 14 (or sources) may be towed behind the vessel.

Figure 9A:
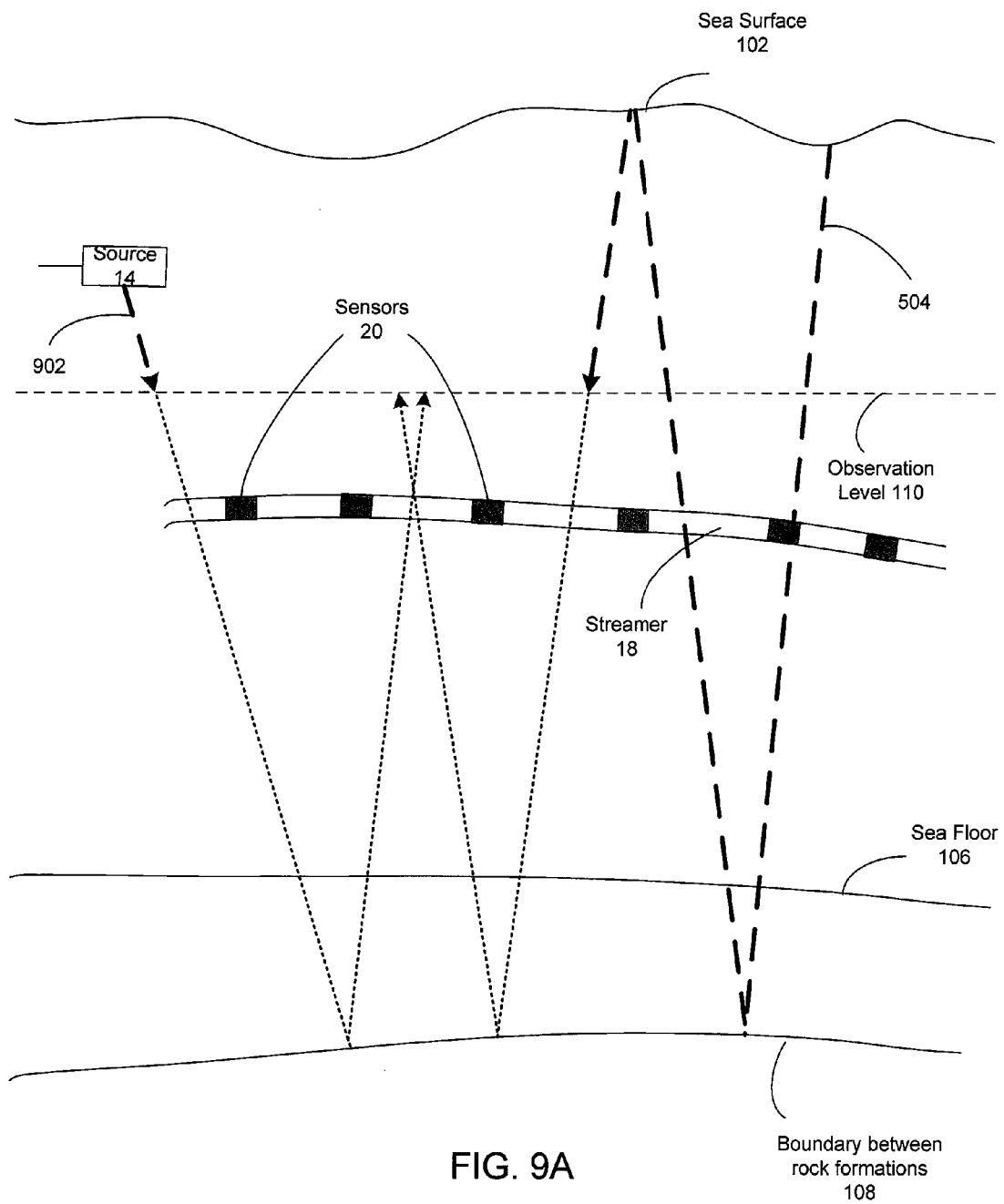
FIGS. 9A and 9B are cross-sectional views depicting example ray paths originating from a sea surface and from an artificial seismic source in accordance with an embodiment of the invention.
Figure 9B:
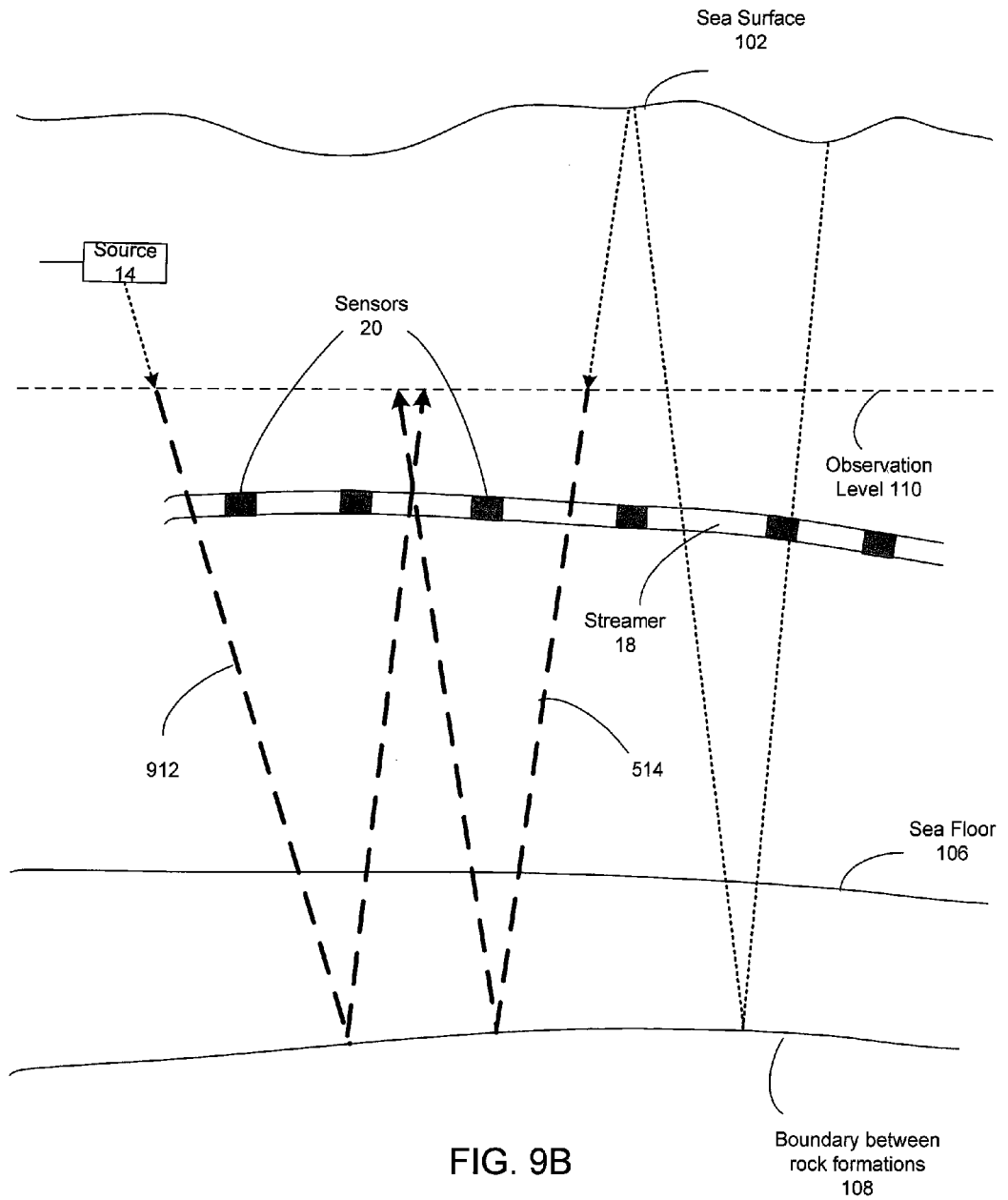

FIGS. 9A and 9B are cross-sectional views depicting example ray paths originating from a sea surface 102 and from an active seismic source 14 in accordance with an embodiment of the invention. The example ray path (504/514) originating from the sea surface 102 is described above in relation to FIGS. 5A and 5B. In addition, FIGS. 9A and 9B depict an example ray path (902/912) originating from the active source 14.

FIG. 9A shows the example direct ray path 902 going from the source 14 downward to the observation level 110. There are, of course, a multitude of such ray paths (from primary and secondary sources) for wave-fields that have as a final "leg" a down-going path to the observation level 110.

The example ray path 912 shown in FIG. 9B continues the ray path 902 of FIG. 9A. This continued ray path 912 is shown reflecting upwards from the subsurface boundary 108 back to the observation level 110. There are, of course, a multitude of such ray paths for wave-fields that have as a final "leg" an up-going path to the observation level 110.

Figure 10:
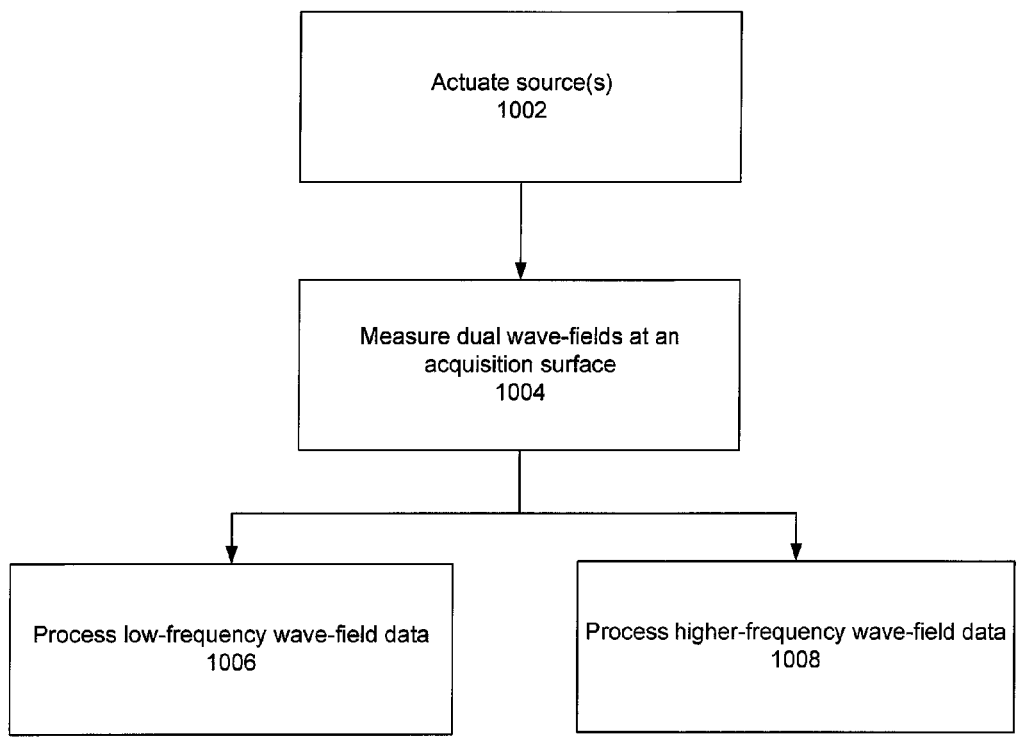
FIG. 10 is a flow chart showing a method for marine seismic imaging using pressure changes caused by sea-surface variations and a seismic source in accordance with an embodiment of the invention.

FIG. 10 is a flow chart showing a method for marine seismic imaging using pressure changes caused by sea-surface variations and at least one active seismic source in accordance with an embodiment of the invention. The method 1000 begins by actuating 1002 the one or more active seismic sources. Subsequently, dual time-dependent wave-fields may be measured 1004 at the acquisition surface below the sea surface. The measured wave-fields include both low-frequency data due to pressure changes caused by sea-surface variations (and other low-frequency sources) and higher-frequency data due to the one or more active seismic sources (and other higher-frequency sources). Filtering may be used to separate the low-frequency wave-field data from the higher-frequency wave-field data.

The low-frequency and high-frequency wave-field data may be processed separately (1006 and 1008, respectively). The low-frequency wave-field data may be processed, for example, as described above in accordance with the method 300 of FIG. 3 to generate seismic images. The higher-frequency wave-field data may be processed, for example, as described in U.S. Patent Application Publication No. US 2010/0008184 by inventors Stian Hegna and Gregory Ernest Parkes, published Jan. 14, 2010, the disclosure of which is hereby incorporated by reference. Other techniques may be employed to process the high-frequency wave-field data. Alternatively, the low-frequency and higher-frequency wave-field data may be processed together (without separating them prior to processing).

Figure 11:
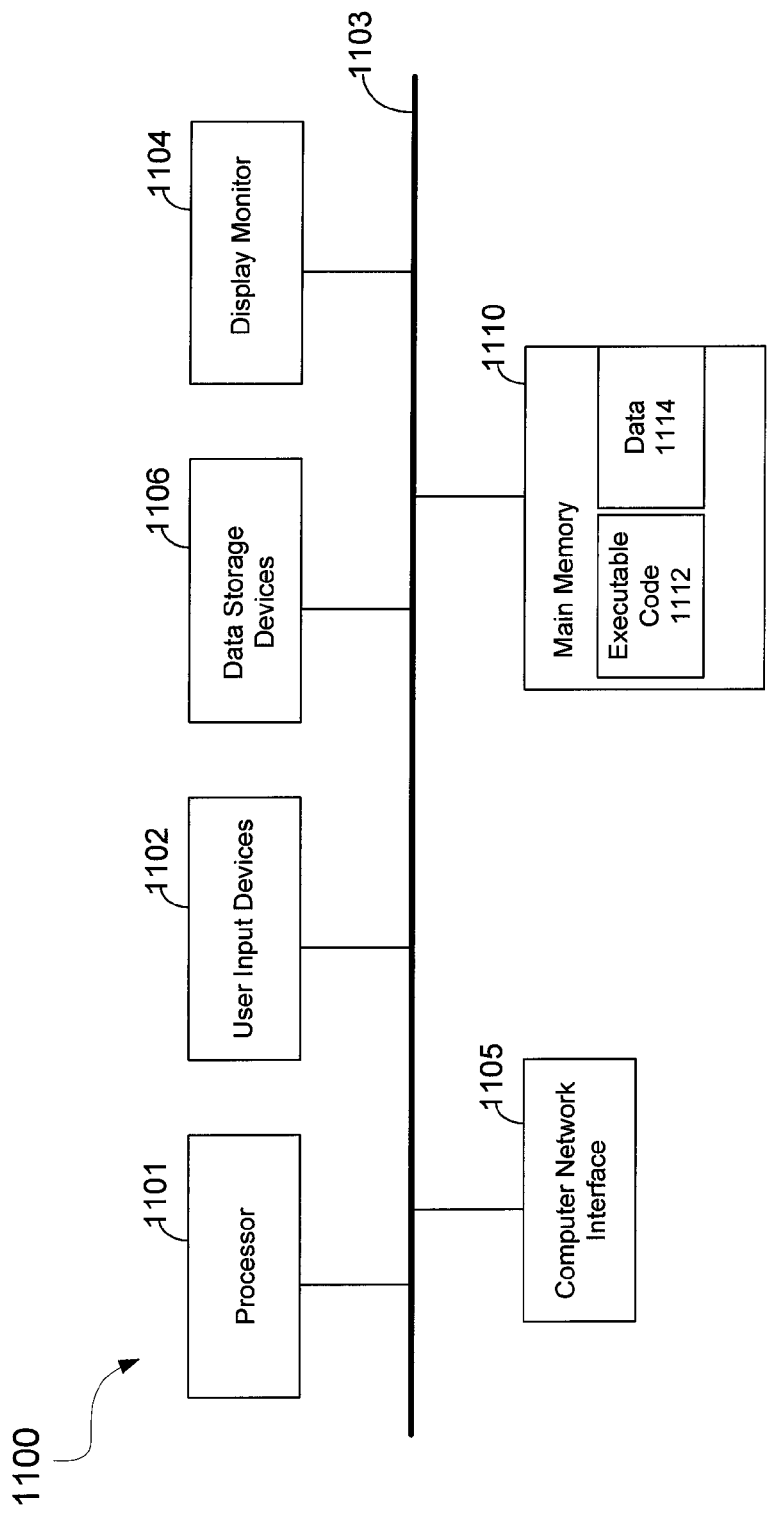
FIG. 11 is a schematic diagram showing an example computer apparatus in accordance with an embodiment of the invention.

FIG. 11 is a schematic diagram showing an example computer apparatus 1100 in accordance with an embodiment of the invention. The computer apparatus 1100 may be configured with executable instructions so as to perform the data processing methods described herein. FIG. 11 shows just one example of a computer which may be used to perform the data processing methods described herein. Many other types of computers may also be employed, such as multi-processor computers, server computers, cloud computing via a computer network, and so forth.

The computer apparatus 1100 may include a processor 1101, such as those from the Intel Corporation of Santa Clara, Calif., for example. The computer apparatus 1100 may have one or more buses 1103 communicatively interconnecting its various components. The computer apparatus 1100 may include one or more user input devices 1102 (e.g., keyboard, mouse), one or more data storage devices 1106 (e.g., hard drive, optical disk, USB memory), a display monitor 1104 (e.g., LCD, flat panel monitor, CRT), a computer network interface 1105 (e.g., network adapter, modem), and a main memory 1110 (e.g., RAM).

In the example of FIG. 11, the main memory 1110 includes executable code 1112 and data 1114. The executable code 1112 may comprise computer-readable program code (i.e., software) components which may be loaded from the data storage device 1106 to the main memory 1110 for execution by the processor 1101. In particular, the executable code 1112 may be configured to perform the data processing methods described herein.

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A method for seismic exploration, the method comprising:
    using pressure changes caused by variations of a sea surface as a low-frequency seismic energy source with no active seismic energy source;
    obtaining dual wave-fields measured below the sea surface;
    selecting an observation level;
    decomposing, by computer, the dual wave-fields into a down-going wave-field and an up-going wave-field at the observation level; and
    generating, by computer, seismic images using the down-going and up-going wave-fields.

2. The method of claim 1, wherein the low-frequency seismic energy source includes wave energy at frequencies less than five hertz.

3. The method of claim 1, wherein the dual wave-field data is acquired at an acquisition surface that is distinct from the observation level.

4. The method of claim 1, wherein generating the seismic images comprises using the down-going wave-field as a source wave-field and using the up-going wave-field as a receiver wave-field.

5. The method of claim 4, wherein generating the seismic images comprises iteratively performing:
    stepwise propagation of the down-going source wave-field forward in time to a depth level;
    stepwise propagation of the up-going receiver wave-field backward in time to the depth level; and
    applying a deconvolution imaging condition to the source and receiver wave-fields to obtain a reflectivity function at the depth level.

6. The method of claim 4, wherein generating the seismic images using the down-going source and up-going receiver wave-fields comprises applying an imaging condition to the down-going source and the up-going receiver wave-fields to obtain seismic image data.

7. The method of claim 1, wherein a first wave-field of the dual wave-fields comprises a pressure wave-field.

8. The method of claim 7, wherein a second wave-field of the dual wave-fields comprises a velocity wave-field.

9. The method of claim 8, wherein the pressure and velocity wave-fields are recorded using a marine-towed dual-sensor streamer.

10. The method of claim 8, wherein the pressure and velocity wave-fields are recorded using an ocean bottom cable or node system.

11. The method of claim 7, wherein a second wave-field of the dual wave-fields comprises a pressure-derivative wave-field.

12. The method of claim 11, wherein the pressure and pressure-derivative wave-fields are recorded using a marine-towed over/under streamer.

13. An apparatus configured to generate seismic images, the apparatus comprising:
    memory configured to store processor-executable code and data;
    at least one processor configured to execute said processor-executable code so as to modify said data;
    processor-executable code configured to obtain dual wave-fields measured below the sea surface, wherein the dual wave-fields are caused by variations in a sea surface as a passive seismic source with no active seismic source;
    processor-executable code configured to select an observation level;
    processor-executable code configured to decompose the dual wave-fields into a down-going wave-field and an up-going wave-field at the observation level; and
    processor-executable code configured to generate seismic images using, at least in part, low-frequency components of the down-going and up-going wave-fields.

14. The apparatus of claim 13, wherein the low-frequency components include frequencies less than five hertz, and wherein a primary source for the low-frequency components comprises pressure-variations of sea-surface waves.

15. The apparatus of claim 13, wherein the processor-executable code configured to generate the seismic images uses the down-going wave-field as a source wave-field and the up-going wave-field as a receiver wave-field.

16. The apparatus of claim 15, further comprising:
    processor-executable code configured to iteratively perform a) stepwise propagation of the down-going source wave-field forward in time to a depth level, b) stepwise propagation of the up-going receiver wave-field backward in time to the depth level, and c) applying a deconvolution imaging condition to the source and receiver wave-fields to obtain a reflectivity function at the depth level.

17. The apparatus of claim 15, further comprising:
    processor-executable code configured to correlate the down-going source and up-going receiver wave-fields to obtain seismic image data.

18. The apparatus of claim 13, wherein a first wave-field of the dual wave-fields comprises a pressure wave-field, a second wave-field of the dual wave-fields comprises a velocity wave-field, and the pressure and velocity wave-fields are measured using a marine-towed dual-sensor streamer.

19. The apparatus of claim 13, wherein a first wave-field of the dual wave-fields comprises a pressure wave-field, a second wave-field of the dual wave-fields comprises a pressure-derivative wave-field, and the pressure and pressure-derivative wave-fields are measured using a marine-towed over/under streamer.

20. The apparatus of claim 13, wherein the dual wave-field data is acquired at an acquisition surface that is distinct from the observation level.

21. A marine seismic imaging system comprising:
   marine seismic wave-field acquisition apparatus configured to measure and record dual wave-field data caused by variations in a sea surface as a passive seismic source with no active seismic source; and
   data processing apparatus configured to generate seismic images from the dual wave-field data, the data processing apparatus including
   memory configured to store processor-executable code and data,
   a processor configured to execute said processor-executable code so as to modify said data,
   processor-executable code configured to decompose the dual wave-field data into a down-going source wave-field and an up-going receiver wave-field at a selected observation level; and
   processor-executable code configured to generate seismic images using, at least in part, low-frequency components of the down-going source and up-going receiver wave-fields.

22. The system of claim 21, wherein the low-frequency components include frequencies less than five hertz.

23. The system of claim 21, wherein the dual wave-field data is acquired at an acquisition surface, and wherein the observation level is distinct from the acquisition surface.

24. At least one tangible computer-readable storage medium with executable code stored thereon which, when executed by one or more processors, performs steps comprising:
   obtaining dual wave-fields measured below a sea surface, wherein the dual wave-fields include low-frequency components whose energy source is passive and comprises variations of a sea surface with no active seismic energy source;
   decomposing the dual wave-fields into a down-going wave-field and an up-going wave-field at an observation level; and
   generating seismic images using the low-frequency components of the down-going source and up-going receiver wave-fields.

* * * * *